United States Patent [19]

Emerton et al.

[11] Patent Number: 5,783,793
[45] Date of Patent: Jul. 21, 1998

[54] PROCESS FOR PRODUCING A PLURALITY OF HOLES IN DOSAGE FORMS USING A LASER BEAM DEFLECTED BY AN ACOUSTO-OPTIC DEFLECTOR

[75] Inventors: Neil Emerton, Cambridge; Graham S. Gutsell; Timothy A. Large, both of Cambs; Stephen Owen, Herts, all of United Kingdom

[73] Assignee: Merck & Co., Inc., Rahway, N.J.

Related U.S. Application Data

[60] Provisional application No. 60/012,500 Feb. 29, 1996.

[21] Appl. No.: 806,974

[22] Filed: Feb. 26, 1997

[51] Int. Cl.$^6$ ...................................................... B23K 26/08
[52] U.S. Cl. .............................. 219/121.71; 219/121.74; 219/121.75; 219/121.77; 219/121.86; 219/121.79
[58] Field of Search .................... 219/121.68, 121.69, 219/121.7, 121.71, 121.75, 121.74, 121.77, 121.78, 121.79, 121.82, 121.84, 121.85, 121.86; 424/467, 473

[56] References Cited

U.S. PATENT DOCUMENTS

| | | | |
|---|---|---|---|
| 4,088,864 | 5/1978 | Theeuwes et al. | 219/121.71 |
| 4,500,770 | 2/1985 | Vock et al. | 219/121.7 |
| 4,540,867 | 9/1985 | Ackerman | 219/121.77 |
| 5,049,721 | 9/1991 | Parnas et al. | 219/121.68 |
| 5,092,350 | 3/1992 | Arthur et al. | 131/281 |
| 5,294,770 | 3/1994 | Riddle et al. | 219/121.7 |
| 5,376,771 | 12/1994 | Roy | 219/121.71 |
| 5,658,474 | 8/1997 | Geerke | 219/121.71 |

OTHER PUBLICATIONS

Jain et al., J. Pharm. Sci., vol. 73 (1984), pp. 1806–1811, "Design of a Slow–Release Capsule Using Laser Drilling".

*Primary Examiner*—Teresa J. Walberg
*Assistant Examiner*—Gregory L. Mills
*Attorney, Agent, or Firm*—Mark R. Daniel; Melvin Winokur

[57] ABSTRACT

A laser drilling process capable of producing a plurality of holes in a pharmaceutical dosage form, at high speed, is presented. The process utilizes a high power $CO_2$ laser steered by an acousto-optic deflector together with various mirrors and optical components to achieve the correct beam path geometry, in order to produce an unlimited number of holes through the surface or coating of a dosage form, at rates up to 100,000 units or more per hour.

6 Claims, 6 Drawing Sheets

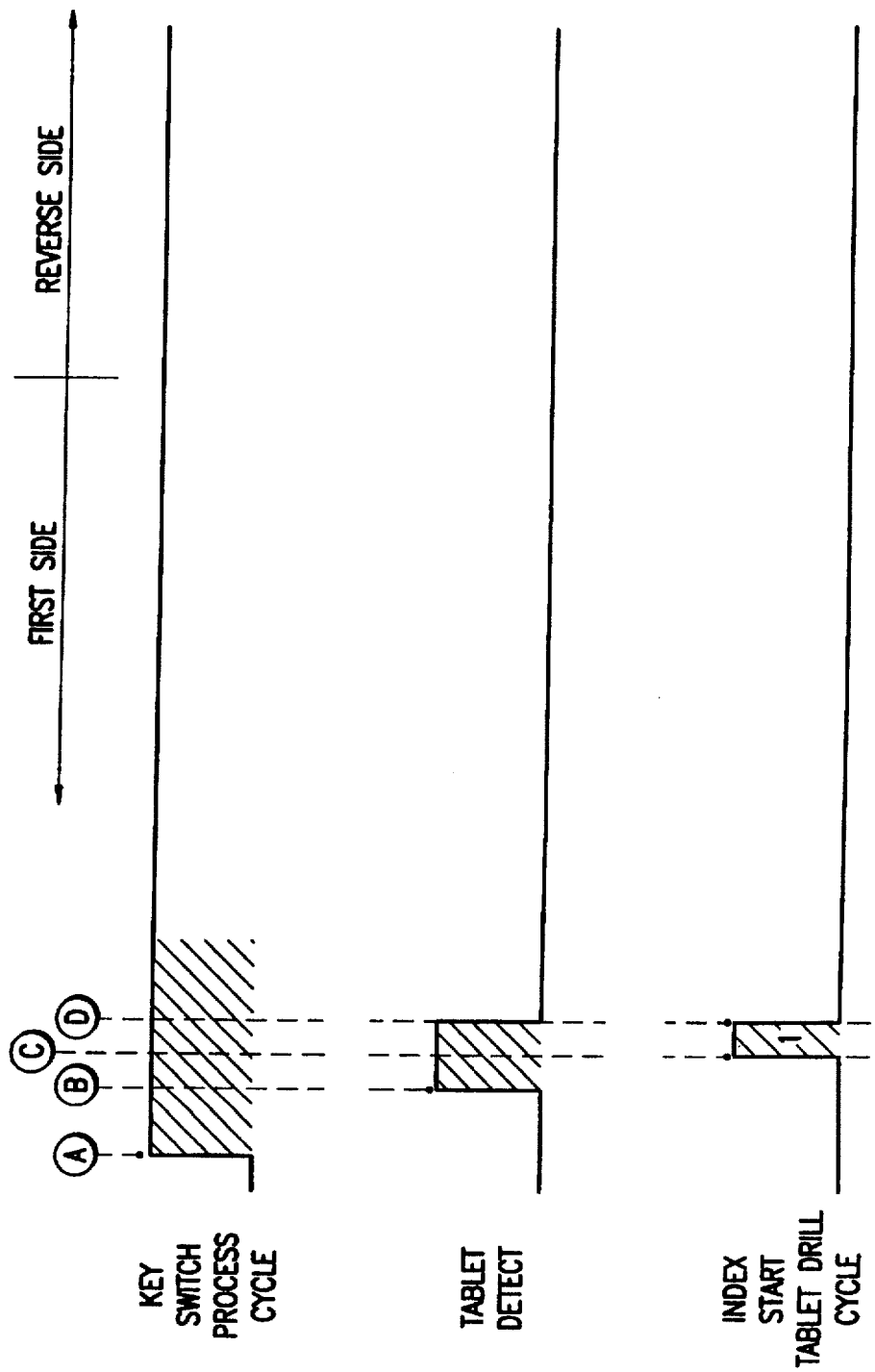

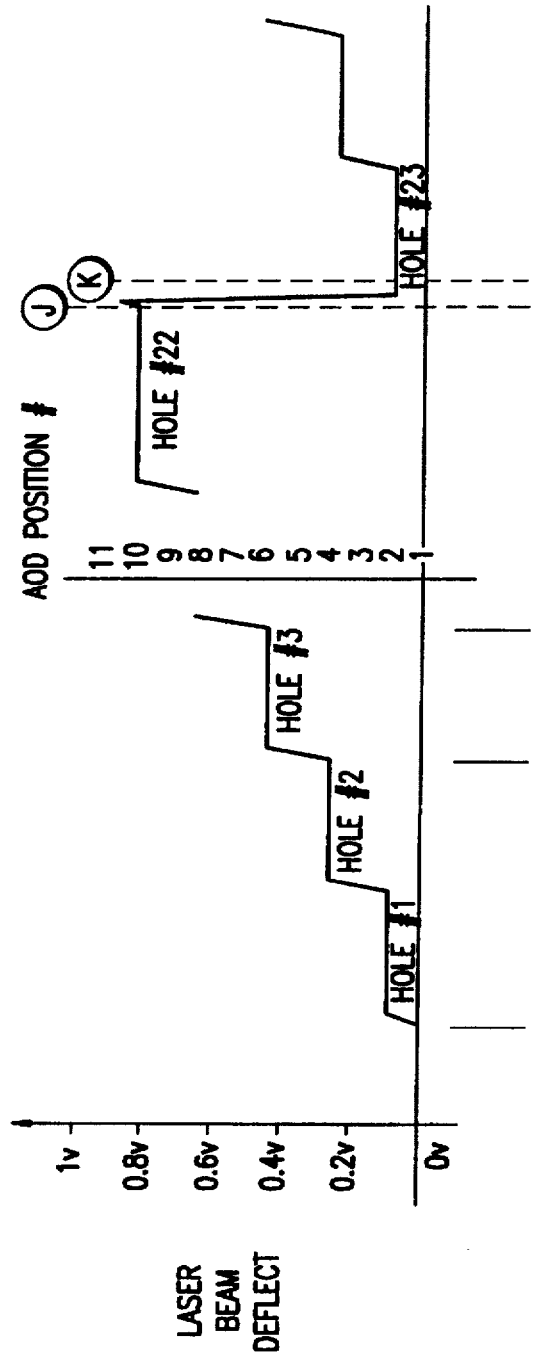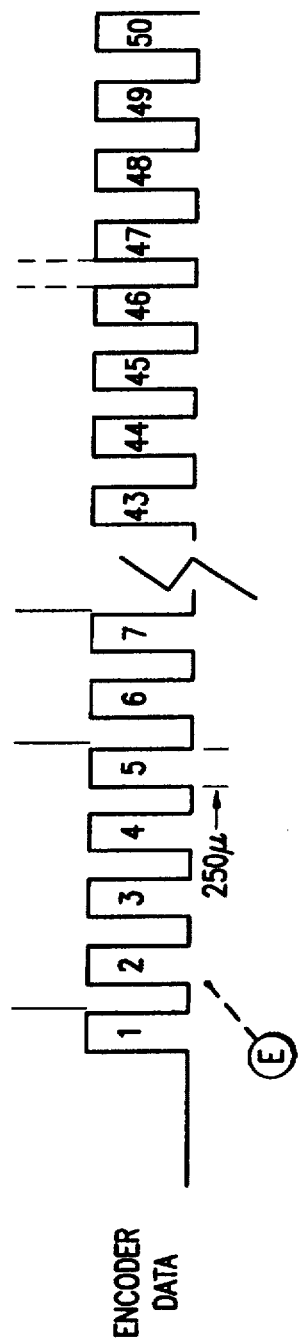

Figures 4F, 4G, 4H:
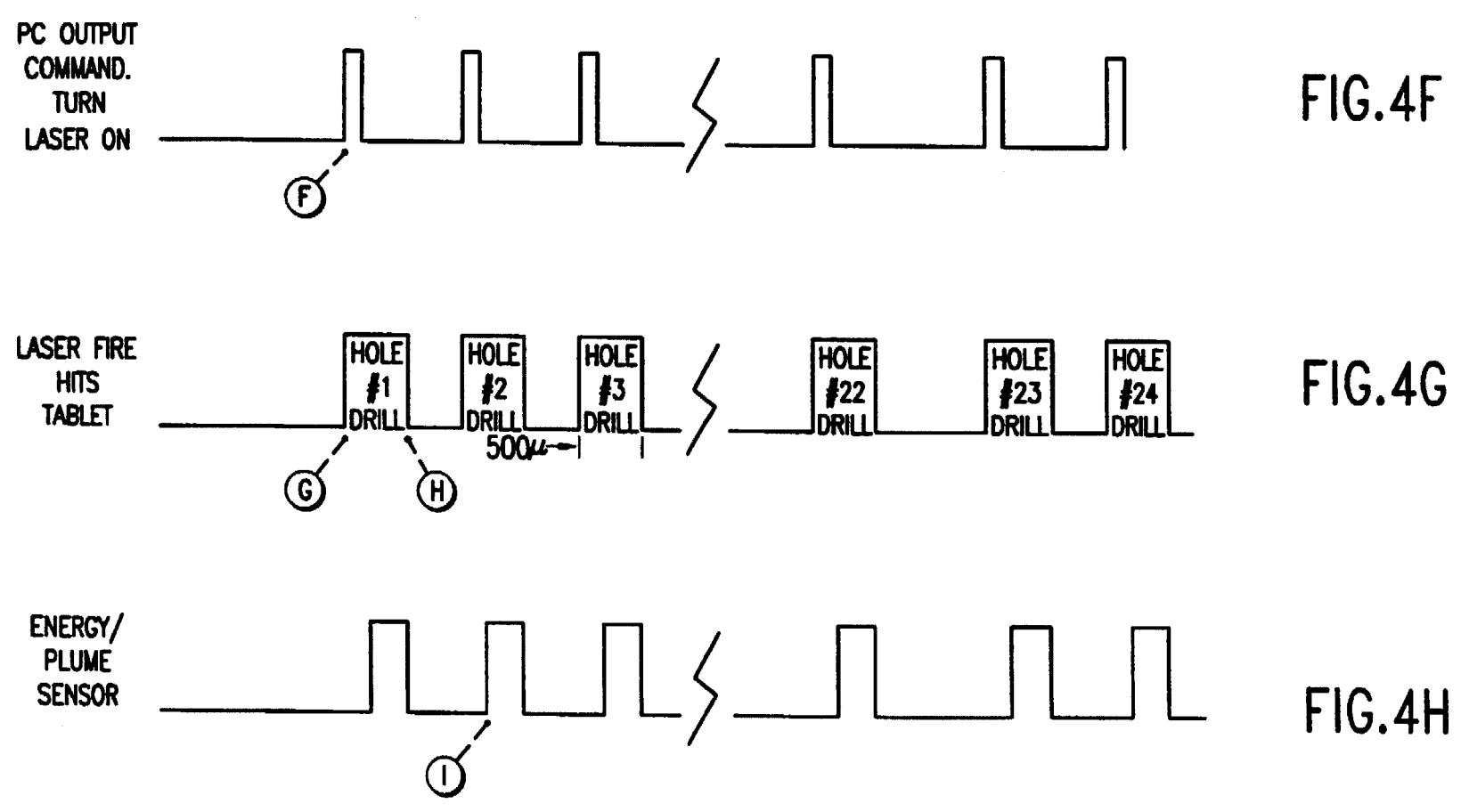

HOLE #1 DRILL
HOLE #2 DRILL
500μ
HOLE #3 DRILL
HOLE #22 DRILL
HOLE #23 DRILL
HOLE #24 DRILL

PC OUTPUT COMMAND. TURN LASER ON

LASER FIRE HITS TABLET

ENERGY/PLUME SENSOR

F

G

H

I

PROCESS FOR PRODUCING A PLURALITY OF HOLES IN DOSAGE FORMS USING A LASER BEAM DEFLECTED BY AN ACOUSTO-OPTIC DEFLECTOR

CROSS-REFERENCE TO RELATED APPLICATIONS

This application claims priority to U.S. provisional application Ser. No. 60/012,500, filed Feb. 29, 1996.

BACKGROUND OF THE INVENTION

There is a need within the pharmaceutical industry to produce an opening in the surface of many types of dosage forms. For example, certain controlled release devices rely on an opening through an outer coating or housing and into the core of the device, as a means of releasing material stored within the core to the environment of use.

Often these controlled release devices rely on osmotic pressure, diffusion or surface hydration to deliver the contents of the core through the opening.

U.S. Pat. No. 4,088,864 reported the use of a laser to produce outlet passage-way in the walls of tablets which dispense their contents osmotically. This technique comprised moving the pills in succession along a predetermined path at a predetermined velocity; tracking the moving pills seriatim with a laser of a wavelength which is absorbable by the walls. The laser beam dimensions at the wall, the laser power and the firing duration were such as to cause the laser beam to heat and pierce the wall and produce an outlet passageway 4 to 2000 microns in diameter through the wall and into the device core.

There is further a need to produce dosage forms containing multiple holes through the outer coating and into the core. The holes expose multiple portions of the dosage form core to the environment of use, allowing for delivery of the drug stored within the core.

Jain, N. K. and Naik S. U., *J. Pharm Sci.*, 73, 1806–1811 (1984), have reported on the use of a laser to drill holes in capsules. To vary the number of pores, the capsule was mounted on a linear drive and moved at a speed of 2 mm/sec. By changing the laser frequency and keeping the power and pulse width constant 25 to 100 pores were drilled on the body of the capsule shell.

Technology required to produce multiple patterns of openings through the dosage form shell or coating without repositioning of the dosage form has previously not been available. A process which provides for rapid though-put of dosage forms, capable of providing such a pattern of openings, without such manipulation is desirable.

Recently, laser systems which employ a linear array of individual laser tubes have been developed. These systems allow the user to pulse only those lasers needed so as to produce a linear array of laser beams. In U.S. Pat. No. 5,049,721, such a system was used to provide markings in an outer jacket of repetitively spaced sections along the length of a moving cable. As the cable was moved along, the lasers were pulsed, via a computer program, to produce letters and symbols. In U.S. Pat. No. 5,376,771, this technology was applied to create multiple arrays of holes in dosage form devices rapidly and precisely.

SUMMARY OF THE INVENTION

A process for producing a plurality of apertures in dosage forms using a laser whose beam is deflected by an acousto-optic deflector is presented. Using this process, the apertures may be produced by individual pulses of laser energy, wherein the laser beam is redirected by a synchronized mirror or mirrors to reproduce similar pluralities of apertures at further faces or areas of the same dosage form. The resultant apertures may be arranged in the form of an m by n matrix to generate a desired pattern of apertures, where m and n range from 1 to about 1000, and more preferably from about 10 to about 200. This technology is particularly effective in producing apertures in pharmaceutical dosage forms such as tablets, capsules, lozenges, boluses, pills, wafers, disks, expandable devices, patches, suppositories, collars, pellets, controlled release devices, slow release devices and other medicament delivery devices, and particularly when the dosage form is film coated. When the film coating is water insoluble and water impermeable, this process offers a rapid and effective means of producing apertures for contact of the dosage form core with the environment of use since the aperture may be drilled through the coating and into the core of the dosage form to insure exposure of the core when in use. While the apertures may be of any size and shape, one preferred embodiment includes apertures which are circular where the diameter ranges from about 100 microns to about 2000 microns. While there is no theoretical limit to the number of apertures which may be drilled in a dosage form using this process, in a preferred embodiment of the process, from 5 to about 1000 apertures are drilled in each face of each dosage form. In a more preferred embodiment of this invention from about 10 to about 200 apertures are drilled in each face of each dosage form.

BRIEF DESCRIPTION OF THE DRAWINGS

FIG. 4, is the laser drilling timing sequence.

DESCRIPTION OF THE INVENTION

Figure 1:
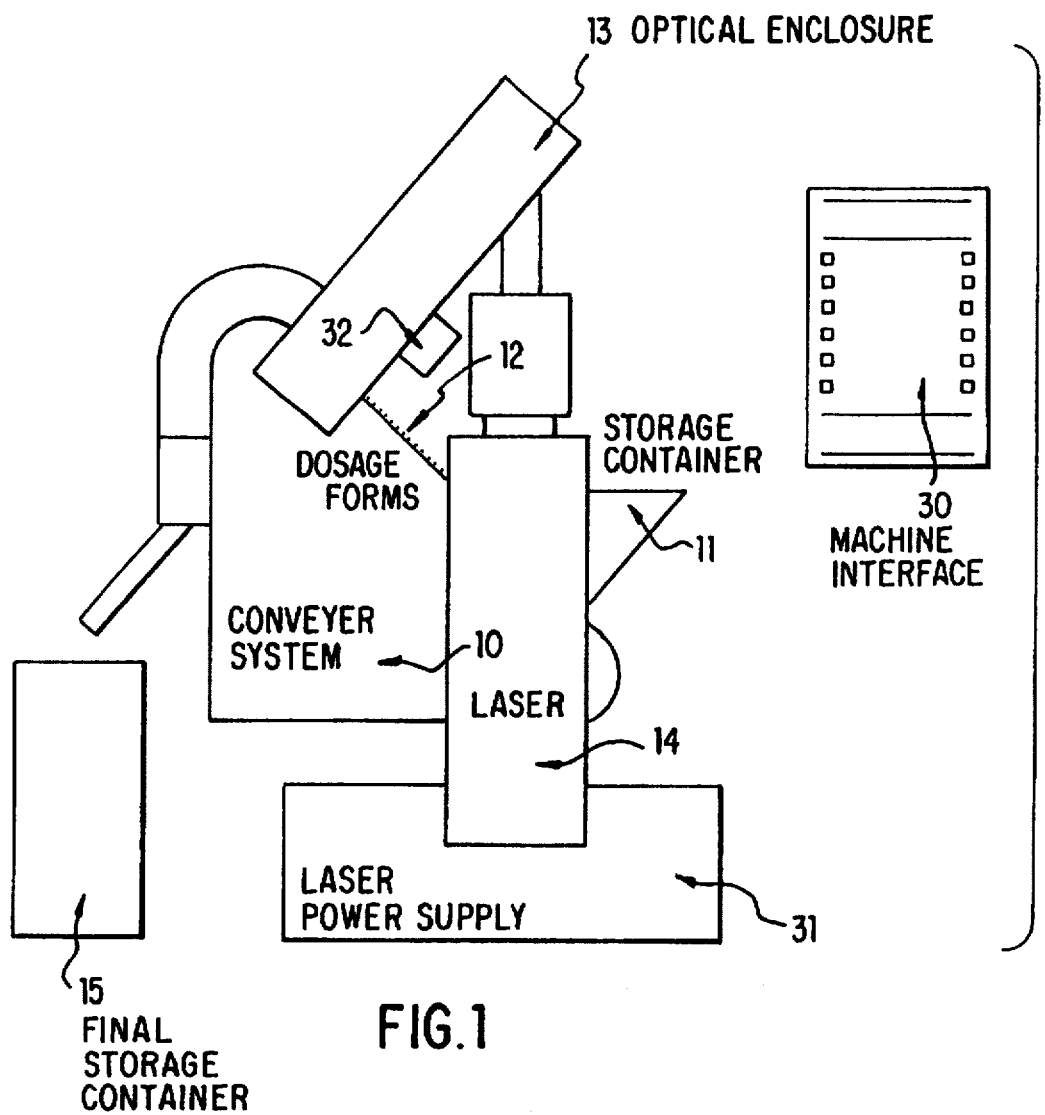
FIG. 1, is a side view of the process wherein dosage forms are continuously moved through the optical enclosure on a chain feeder mechanism.

The present invention is directed to a novel process for producing a plurality of apertures in chemical dosage forms at high speed using a laser whose beam is deflected by an acousto-optic deflector.

This novel process provides for the production of dosage forms which are able to deliver their contents once in an environment of use. For example, pharmaceutically active product may be dispensed to an animal, including man, in need thereof; flavoring, sugar, or sugar substitutes may be dispensed from confections; chemicals useful in the treatment of water may be added to water reservoirs using dosage forms which are prepared using this novel process. By "dosage form" is meant any device capable of delivering a chemical which requires a plurality of apertures through which the chemical may move into the environment of use. The term "pharmaceutical dosage form", as used herein, refers to a dosage form useful in the delivery of a pharmaceutically active agent to a patient, in need thereof, the dosage form having been prepared using the process of this invention.

The environment of use is not limited. It may be of a biological nature, for example, when the device is used pharmaceutical drug delivery, or for the preparation of a confection. This novel process may also be used in industrial environments such as water or air treatment, or any other area in need of delivery of a chemical through a plurality of apertures.

The term "dosage form" further includes, but is not limited to items such as coated or uncoated tablets, capsules, lozenges, boluses, pills, wafers, disks, expandable devices, patches, suppositories, collars, pellets, controlled release devices, slow release devices, room freshener devices, water treatment delivery devices, confections, candies, and other chemical delivery devices. This process is particularly useful when used to produce a pharmaceutical dosage form which is film coated, since the apertures can then be used to expose portions of the core of the pharmaceutical dosage form to the environment where the dosage form will ultimately be used, such as the stomach and intestine.

This process is particularly useful in the production of a pharmaceutical dosage form when the film coating applied to the dosage form is insoluble in an aqueous environment or impermeable to aqueous solutions or where the coating is both impermeable and insoluble in an aqueous environment. By an "aqueous environment" is meant, an environment which is, at least in part, water. Examples of the type of environment where such a dosage form would be used includes, but is not limited to the mouth, bucal cavity, stomach, large and small intestine, vagina, and nasal passages.

Since release rate of the contents of the pharmaceutical dosage form contemplated for use in this process is a function of the number and size of the apertures, it is critical that the method produce apertures which are uniform in both size and number. The method presented herein provides for both rapid and accurate drilling of dosage forms where the aperture diameters are consistent and the number of apertures in the dosage form are constant.

In a preferred embodiment of this invention, the apertures are drilled in the face of the dosage form. By "face" is meant the most significant or prominent surface or surfaces of a dosage form. For example, when the faces of a pharmaceutical dosage form such as a tablet or capsule are discussed, the word "face" or "faces" is used to describe the opposed surfaces with the greatest area.

While the apertures may be of any size and shape, one preferred embodiment includes apertures which are circular where the diameter ranges from about 100 microns to about 2000 microns. While there is no theoretical limit to the number of apertures which may be drilled in a dosage form using this process, in a preferred embodiment of the process, from about 5 to about 1000 apertures are drilled in each face of each dosage form. In a more preferred embodiment of this invention from about 10 to about 200 apertures are drilled in each face of each dosage form.

The dosage form to be processed is passed at constant velocity through an optical enclosure during which it is bombarded a number of times by pulses of laser energy, thereby producing a plurality of apertures. The desired spatial separation of the apertures is achieved by delivering the pulses at predetermined beam deflection angles as the dosage form passes through specific positions in its direction of travel. In such a way, a pattern, such as a rectangular matrix or array, can be produced on a face or in one general area of the dosage form.

Having generated the first pattern on a particular dosage form, the laser beam can be redirected by means of a mirror or mirrors synchronized with the travel velocity, to reproduce similar patterns at further faces or areas of the same dosage form.

The pattern is defined by a computer file containing the delivery timings of laser pulses together with the corresponding values of beam deflection angle. It is thereby possible to define different patterns for individual dosage forms, or more commonly, for different batches or types of dosage forms.

By "optical enclosure" is meant the area in which the laser beam is contained, and through which the dosage forms pass in order to be drilled or processed.

By "apertures" is meant holes or openings starting at the surface of the dosage form and extending into the dosage form to a predetermined depth. Alternatively, the apertures may go completely through the dosage form. The apertures may pierce the coating of a dosage form thus exposing the interior of the dosage form to the environment of use. Additionally, the apertures may provide an exit means for the chemical stored inside a dosage form to be expelled under osmotic pressure, diffusion, surface hydration, erosion, or mechanical force.

The apertures may be arranged closely so as to produce perforations which define an area of the dosage form which is to be discarded prior to use or expelled during use. Further, the apertures may be arranged in a manner which produces a pattern which identifies the dosage form prior to or during use. Additionally the pattern may be used to produce a design, spell out a code, trademark or other symbol.

The pattern may constitute an array containing any number of apertures. When boluses and other large dosage forms are prepared for example, m×n arrays containing from 1 to 1000 or more apertures may be needed. Thus, it would not be outside this invention for a dosage form to contain 1000 columns of apertures each containing 50 to 100 apertures (i.e. m=1000 and n=50 to 100).

When other smaller dosage forms are prepared, m×n arrays containing from 10 to 50 apertures may be required. Thus, it would be within this invention for a dosage form to contain 5 columns of 10 apertures each (i.e. m=5 and n=10).

The laser drilling system may be used either alone or in conjunction with a printing means to inscribe alpha-numeric characters or other symbols on the dosage form using technology such as that described in U.S. Pat. No. 5,049,721 which is hereby incorporated by reference, in such a manner that the characters mask or hide the apertures.

The number and size of the apertures is determined by the end use of the dosage form. For example, such apertures could be used to limit or enhance the delivery rate of the chemical to the environment of use.

In the pharmaceutical field, the dosage form may consist of a tablet or other drug delivery device. The drug delivery device may be coated or uncoated. Uncoated tablets may contain apertures in order to assure rapid disintegration of the tablet or to produce incursions which help in breaking the tablet. Coated tablets may contain apertures to assist in entry of fluid from the environment of use, allow for passage of drug from the core of the tablet to the environment or to define the amount of core area exposed to the environment.

The dosage form may be a core which comprises a polymer which forms gelatinous microscopic particles upon hydration and a medicament, the core being completely coated with a water insoluble and water impermeable coating. This process for producing a plurality of apertures may then be used to drill a predetermined number of apertures into the surface of the dosage form. If the dosage form has distinct faces, apertures may be drilled in all of the faces, either sequentially or simultaneously. In a system of this type, the apertures provide access to the solution which makes up the environment of use. The solution hydrates the polymer at the exposed surfaces. The polymer forms gelatinous microscopic particles which move from the tablet into the environment of use, carrying with them the active ingredient.

DESCRIPTION OF PREFERRED EMBODIMENT

An example of the present invention will now be described with reference to the accompanying drawings. This example is not designed to limit the scope of this invention in any way.

In FIG. 1, dosage forms (12) are delivered to a moving conveyer system (10) from a storage container (11). The storage container (11) has a capacity of up to 200,000 dosage forms. The moving conveyer system (10), preferably a chain or belt transport mechanism, transports the dosage form into and out of the optical enclosure (13) of the laser (14). The apertured dosage forms are collected in a final storage container (15).

The laser (14) is mounted vertically on one side of the apparatus with the beam directed vertically upwards through a polarization rotator, onto a mirror. The mirror directs the beam into an optical enclosure (13) consisting of a number of optical components mounted at approximately 90° to the chain transport mechanism.

Figure 2:
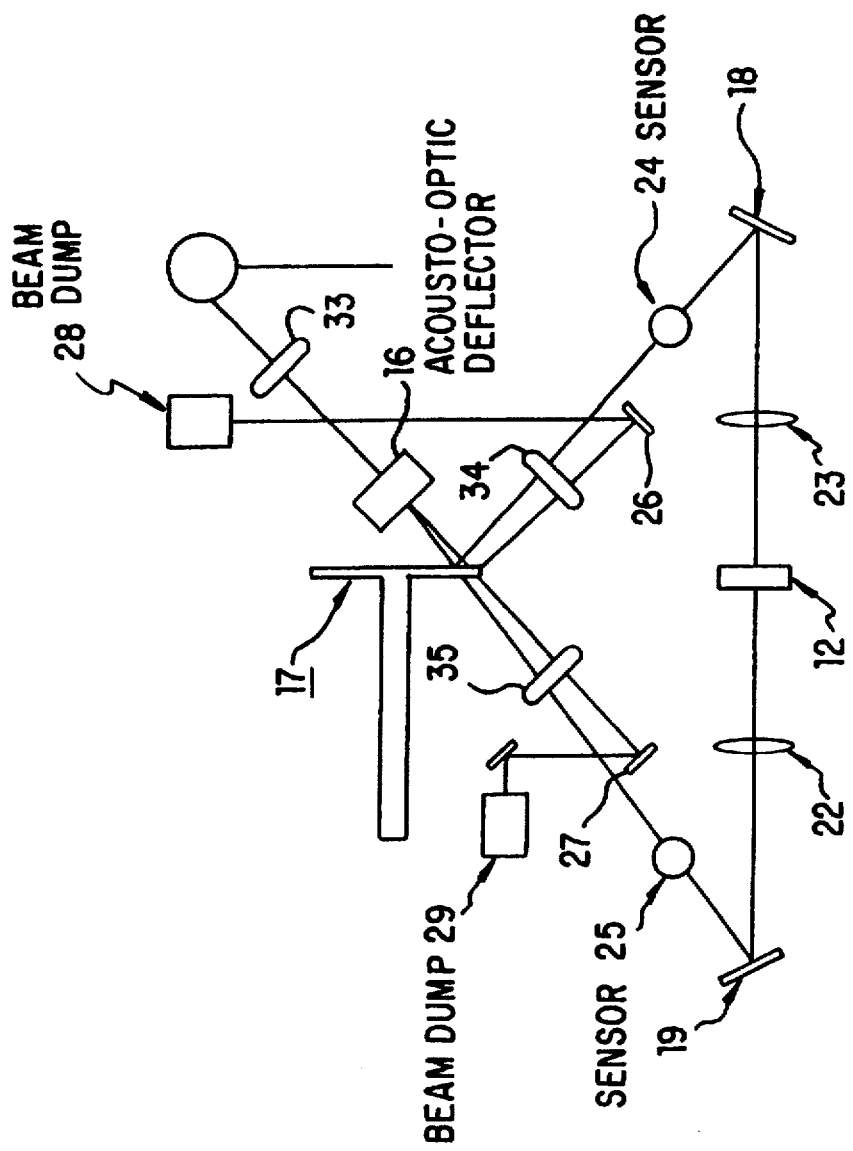
FIG. 2, is a diagrammatic view of the optical enclosure of the system.

The components in the optical enclosure are shown in FIG. 2 and consist primarily of the following:

- An acousto-optic deflector (16) which is a solid-state beam steering device. This is used to steer the beam, which ultimately scans across the tablet. It consists of a germanium crystal with 10 (typical) lithium niobate acoustic transducers in a phased array on one side. These launch an acoustic wave across the crystal that interacts with the optical beam.
- Three cylindrical lenses (33,34,35), which are used to focus the beam into the aperture of the acousto-optic deflector (16), and subsequently recollimate. These are five inch focal length antireflection coated zinc selenide planoconvex lenses.
- A special aluminum rotating mirror (17) with a 180° lobe. Machined from aluminum, nickel electroplated and gold coated. The mirror rotates once for every tablet that passes the lasing point and diverts the beam, first to one side of each tablet, and then the other, as the lobe passes in and out of the beam path.
- Two deflecting mirrors (18,19) to direct the beam to the lasing point. These are gold coated silicon flat mirrors.
- Two lenses (22,23) (one each side), of 5" focal length to focus the beam onto the tablet.
- Under certain conditions, two special sensor units (24,25) (one of each on each side) which monitor the beam energy in each pulse and the presence of the corresponding visible flashes to confirm that drilling has taken place. The power sensor, comprises a 45° zinc selenide component having a 90° residual reflection of typically 1%, a secondary focus lens and a pyrodetector is included. The sensor analyses the change in power loading on the pyrodetector and thereby infers the laser power during the pulse.
- Two small mirrors (26,27) and beam dumps (28,29) (1° dia gold coated silicon beam dumps water cooled black anodized fitting with conical beam absorbing aperture). These absorb the beam energy when it is not being deflected to the target.

The whole optical cavity is maintained at positive pressure by a small fan drawing in air from outside the machine to prevent ingress of any dust generated by the drilling process.

Figure 3:
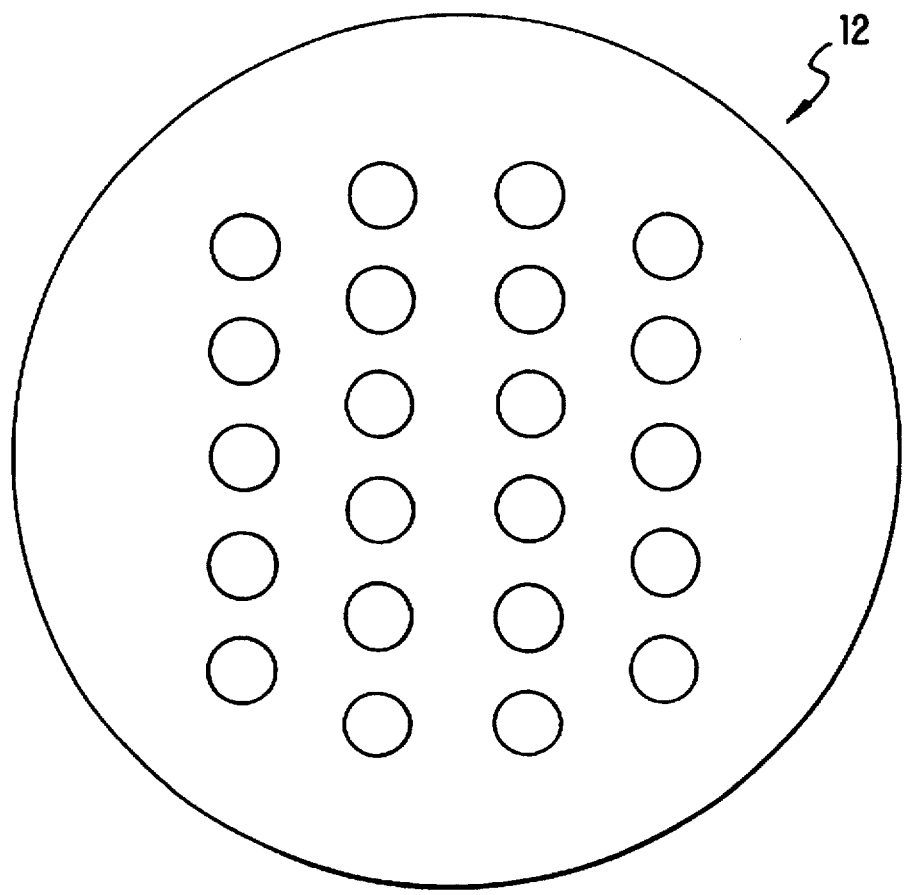
FIG. 3, is a plan view of an apertured dosage form containing 22 apertures on each face.

One possible array of 22 is found in FIG. 3. Alternative designs may be generated by controlling the timing and deflection of beam pulses as the tablet passes through the optical enclosure.

Referring back to FIG. 1, the machine interface (30) allows the operator to exercise control of the machine. The laser power supply unit (31) is located in the base of the machine, and the acousto-optic deflector driver (32) is located in close proximity to the deflector, on one of the outer faces of the optical enclosure.

Referring to FIG. 3, the apertures (40) are a plurality of drilled openings which pierce the outer surface coating of the dosage form.

The diameter and depth of the apertures in the dosage form is a function of the duration of each pulse, the laser power, the optical resolution, and to some extent the composition of the dosage form.

In alternative embodiments of the present invention, other laser systems may be used to produce the apertures in the dosage form. The laser drill of the preferred embodiment includes a carbon dioxide laser (150 W, 225 W, or greater). Other lasers, including, but not being limited to, an argon laser, another carbon dioxide laser, a neodymium: YAG laser, an erbium:YAG laser, and an excimer laser, may be used so long as the laser is able to produce apertures in the dosage form (12).

The steering system for the laser is an acousto-optic deflector, driven by a module consisting of a voltage controlled oscillator and broadband power amplifier. A preferred acousto-optic deflector and drive module is available commercially, from IntraAction Corp., Bellwood, Ill., models AGD402A1 and DE4020 respectively. The latter is designed to provide a frequency sweep range from 30 to 50 MHz with a ±0.25% frequency linearity specification. The RF power amplifier is capable of 20 watts output and can withstand any mismatched load whether a short, open or complex impedance. The system is also provided with an interlock circuit for thermal protection.

In addition to the optical components described above, the main drive motor is also located in the optical enclosure. The latter is a DC motor with integral tachometer to provide a speed control capability and thereby prevent excursions into regimes which are beyond the laser's capacity.

The rotating mirror is coupled directly to the motor shaft.

A toothed timing belt drive, also taken from the main motor shaft, drives the tablet feeder mechanism via a harmonic drive speed reducer. The latter is a compact gearbox of high quality, both in terms of mechanical backlash and non-linearity.

An encoder is also coupled to the motor shaft. This provides output signals which are used to regulate the timing of beam pulse deliveries. In this way, if the machine speed varies slightly under different operating conditions, the occurrence of beam pulses relative to tablet position, and hence the pattern generated, is unaffected.

Since debris is produced by the lasing system, it is removed by a dust extraction system, using nozzles and filtering air cleaner units. The latter are commercially available, and can be set up to conform to generally accepted international standards for the removal of pharmaceutical dusts.

The laser drilling timing sequence can best be understood by reference to FIG. 4, where the letters A through K indicate the activity at any given point in the sequence. The following cycle shows the drilling of holes in both faces of a dosage form:

(A) a process cycle enable bit is latched on by the start/stop key, this allows the encoder pulses to now drive the laser;

(B) the leading edge of the next tablet to be drilled is detected as it sits in its carrier;

(C) the index pulse is detected once per revolution of the motor shaft;

(D) on the trailing edge of the index pulse, the beam deflector is position for the first hole;

(E) even pulses, of low to high transitions, are detected by a computer and are used as a trigger to turn on the computer analog output and fire the laser;

(F) the computer analog output command to fire the laser is turned on;

(G) the laser remote control interface fires the laser;

(H) the laser is turned off;

(I) the energy plume detection sensor system is engaged; steps (E), (F), (G) and (H) are repeated as necessary until all the apertures on the first face of the tablet have been drilled, the mirror may then be rotated through 180° and drilling on the reverse side, or second face, is initiated;

(J) if drilling on a second face is desired, the laser beam is positioned to drill the first hole in the reverse side of the dosage form;

(K) the laser is fired and the process continues as above.

EXAMPLE

Tablets cores containing lovastatin, CARBOPOL 974 P.® trisodium citrate dihydrate and lactose in ratios of 5:2:4:2 were prepared by compression using ¼" standard concave punches after wet granulation with 5% polyvinyl pyrollidone and 90% ethanol 10% water. The tablets were coated to a thickness of 100 microns with a coating composition comprising cellulose acetate butyrate and triethyl citrate, using a glatt GPCG-3 column coater.

Twenty-two apertures were drilled in each face of the coated tablets, as shown in FIG. 3, using the laser drilling system described at full power and at a surface feed rate corresponding to approximately 48,000 tablets per hour. The tablets were arranged in the carrier links at a spacing of two to an inch and both faces for the tablet were drilled serially, that is, one side and then the other. The approximate hole size, as measured by microscopic imaging using an Analytical Imaging Concepts IM4000, is 0.45 mm in diameter.

The in vitro release rate performance is determined at 37° C. in isotonic, phosphate buffer at pH 7.4 containing 0.4% w/w sodium dodecylsulfate using a USP Apparatus 2 at 50 rpm. The cumulative percent lovastatin released was measured against time. Approximately 80% of the contents was released in 8 hours. The last 20% of drug was released at a more constant rate and greater than >95% of the lovastatin content was released in less than 20 h.

What is claimed is:

1. A process for producing a plurality of apertures in a dosage form by deflecting a laser beam with an acousto-optic deflector comprising the steps of:

(a) delivering dosage forms (12) to a moving conveyer system (10) which transports the dosage form into and out of an optical enclosure (13) of a laser (14);

(b) a mirror directing the beam of the laser into the optical enclosure (13) comprising optical components mounted at approximately 90° to the conveyer system; the optical components comprising:

(i) an acousto-optic deflector (16) which steers the laser beam to scan across the dosage form;

(ii) a rotating mirror (17) with a 180° lobe; the mirror rotating once for every dosage form that passes a lasing point and diverts the beam of the laser, first to one face of each dosage form, and then to an opposing face, as the lobe passes in and out of a laser beam path;

(iii) two deflecting mirrors (18,19), each deflecting mirror being positioned so as to direct the beam to the lasing point on either side of the dosage form;

(iv) two lenses (22,23), one on each side of the dosage form, to focus the beam onto the dosage form; wherein, upon a command issuing from a machine interface, the beam of the laser is directed to the exact position on the tablet where an aperture is to be scored.

2. The process of claim 1, wherein the optical components of the optical enclosure further comprises three cylindrical lenses (33,34,35) which are used to focus the beam of the laser into an aperture of the acousto-optic deflector (16) and subsequently recollimate the beam of the laser.

3. The process of claim 1, wherein the moving conveyer system is a chain transport mechanism.

4. The process of claim 1, wherein the moving conveyer system is a belt transport mechanism.

5. The process of claim 1, wherein the optical enclosure is maintained at a positive pressure.

6. The process of claim 1, wherein the dosage form is a pharmaceutical dosage form.

* * * * *